(12) United States Patent
Nilosek

(10) Patent No.: US 11,948,329 B2
(45) Date of Patent: *Apr. 2, 2024

(54) SYSTEM USING IMAGE CONNECTIVITY TO REDUCE BUNDLE SIZE FOR BUNDLE ADJUSTMENT

(71) Applicant: Pictometry International Corp., Rochester, NY (US)

(72) Inventor: David Nilosek, Bothell, WA (US)

(73) Assignee: Pictometry International Corp., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,061

(22) Filed: Nov. 18, 2022

(65) Prior Publication Data

US 2023/0081366 A1    Mar. 16, 2023

Related U.S. Application Data

(63) Continuation of application No. 17/078,928, filed on Oct. 23, 2020, now Pat. No. 11,625,907.

(Continued)

(51) Int. Cl.
  *G06V 10/75* (2022.01)
  *G06T 5/50* (2006.01)
  (Continued)

(52) U.S. Cl.
  CPC .............. *G06T 7/73* (2017.01); *G06T 5/50* (2013.01); *G06V 10/25* (2022.01); *G06V 10/457* (2022.01); *G06V 10/462* (2022.01); *G06V 10/757* (2022.01)

(58) Field of Classification Search
  CPC .... G06V 10/457; G06V 10/25; G06V 10/462; G06V 10/757; G06T 5/50;
  (Continued)

(56) References Cited

U.S. PATENT DOCUMENTS 7,352,386 B1  4/2008  Shum et al.
7,363,157 B1  4/2008  Hanna et al.
(Continued)

FOREIGN PATENT DOCUMENTS

WO    WO 2017/037423 A1    3/2017

OTHER PUBLICATIONS

Zhu et al., "Local Readjustment for High-Resolution 3D Reconstruction", CVPR '14: Proceedings of the 2014 IEEE Conference on Computer Vision and Pattern Recognition, IEEE Computer Society, 1730 Massachusetts Ave., NW Washington, DC, United States, Jun. 2014.

(Continued)

*Primary Examiner* — Aaron W Carter
(74) *Attorney, Agent, or Firm* — DUNLAP CODDING, P.C.

(57) ABSTRACT

Systems and methods are disclosed, including a non-transitory computer readable medium storing computer executable instructions that when executed by a processor cause the processor to identify a first image, a second image, and a third image, the first image overlapping the second image and the third image, the second image overlapping the third image; determine a first connectivity between the first image and the second image; determine a second connectivity between the first image and the third image; determine a third connectivity between the second image and the third image, the second connectivity being less than the first connectivity, the third connectivity being greater than the second connectivity; assign the first image, the second image, and the third image to a cluster based on the first connectivity and the third connectivity; conduct a bundle adjustment process on the cluster of the first image, the second image, and the third image.

20 Claims, 11 Drawing Sheets

Related U.S. Application Data

(60) Provisional application No. 62/925,917, filed on Oct. 25, 2019.

(51) Int. Cl.
*G06T 7/73* (2017.01)
*G06V 10/25* (2022.01)
*G06V 10/44* (2022.01)
*G06V 10/46* (2022.01)

(58) Field of Classification Search
CPC . G06T 2207/10016; G06T 2207/10032; G06T 2207/20016; G06T 2207/30181; G06T 7/73

See application file for complete search history.

(56) References Cited

U.S. PATENT DOCUMENTS

| | | | |
|---|---|---|---|
| 8,442,307 B1 | 5/2013 | Anati et al. | |
| 8,861,785 B2 | 10/2014 | Oi et al. | |
| 8,897,543 B1* | 11/2014 | Lin | G06T 7/593 |
| | | | 382/154 |
| 8,965,107 B1* | 2/2015 | Schpok | G06V 20/64 |
| | | | 382/284 |
| 9,036,044 B1* | 5/2015 | Bae | G06T 7/33 |
| | | | 348/222.1 |
| 9,432,636 B2 | 8/2016 | Gourlay et al. | |
| 9,465,976 B1 | 10/2016 | Schpok et al. | |
| 9,488,492 B2 | 11/2016 | Samarasekera et al. | |
| 9,607,219 B2 | 3/2017 | Greveson et al. | |
| 9,679,381 B2 | 6/2017 | Martini | |
| 10,311,297 B2* | 6/2019 | Greveson | H04N 7/18 |
| 11,443,452 B2* | 9/2022 | Nilosek | G06T 7/74 |
| 2008/0118160 A1* | 5/2008 | Fan | G06F 16/51 |
| | | | 707/E17.031 |
| 2014/0100693 A1* | 4/2014 | Fong | B25J 11/0085 |
| | | | 700/253 |
| 2014/0219514 A1* | 8/2014 | Johnston | G06V 20/13 |
| | | | 382/113 |
| 2014/0300686 A1 | 10/2014 | Campbell et al. | |
| 2016/0048978 A1 | 2/2016 | Jachalsky et al. | |
| 2016/0117573 A1 | 4/2016 | Sorgi | |
| 2017/0046868 A1 | 2/2017 | Chernov et al. | |
| 2017/0178372 A1* | 6/2017 | Gormish | G06T 11/60 |
| 2020/0388048 A1* | 12/2020 | Nilosek | G06T 7/73 |
| 2021/0019937 A1* | 1/2021 | Gallaway | G06T 15/20 |
| 2021/0124975 A1* | 4/2021 | Nilosek | G06T 7/73 |
| 2021/0295467 A1* | 9/2021 | Rao | G06T 3/0075 |
| 2022/0392157 A1* | 12/2022 | Glira | G06T 7/80 |

OTHER PUBLICATIONS

Kai et al., "Out-of-Core Bundle Adjustment for Large-Scale 3D Reconstruction", 2007 IEEE 11th International Conference on Computer Vision, IEEE, Oct. 2007.

Nilosek et al., "Using Spatial Filter to Reduce Bundle Adjustment Block Size", U.S. Appl. No. 16/895,858 (Unpublished), filed Jun. 8, 2020.

Recker et al., "Depth Data Assisted Structure-from-Motion Parameter Optimization and Feature Track Correction", IEEE Applied Imagery Pattern Recognition Workshop (AIPR), 2014.

Fadaeleslam et al., "Efficient Key Frames Selection for Panorama Generation from Video", Journal of Electronic Imaging, vol. 20(2), Jun. 2011.

European Patent Office acting as the International Search Authority, International Search Report and Written Opinion regarding application PCT/US2020/057125, dated Feb. 15, 2021.

Yan et al., "Estimation of Camera Positions over Long Image Sequences," ICGST Graphics, Vision and Image Processing, vol. 10, issue V, pp. 39-47, 2010.

* cited by examiner

SYSTEM USING IMAGE CONNECTIVITY TO REDUCE BUNDLE SIZE FOR BUNDLE ADJUSTMENT

CROSS-REFERENCE TO RELATED APPLICATIONS

This application is a continuation of the patent application identified by U.S. Ser. No. 17/078,928, filed Oct. 23, 2020, which claims priority to the provisional patent application identified by U.S. Ser. No. 62/925,917, filed Oct. 25, 2019, titled "SYSTEM USING IMAGE CONNECTIVITY TO REDUCE BUNDLE SIZE FOR BUNDLE ADJUSTMENT", the entire contents of all of which are hereby expressly incorporated herein by reference.

BACKGROUND

Aerial Triangularization is used to create a point cloud from a set of overlapping images by determining feature points shown in the overlapping images and determining a three-dimensional location of the feature points using what is known in the art as camera pose data of each of the overlapping images. A candidate feature point is the depiction of a same object in two or more of the overlapping images. The same object can be virtually anything that can be identified in at least two overlapping images.

In a traditional aerial survey system, camera pose data describes intrinsic (interior) and extrinsic (exterior) parameters of the camera(s). Intrinsic parameters include focal length, principal point, radial distortion, and other parameters describing the camera used to capture the image. Extrinsic parameters typically define the 3D position and pose of a camera for each frame, for example, using six parameters (x, y, and z absolute position parameters; and $\omega$, $\phi$ and $\kappa$ rotational (pose) parameters). The six parameters for the frames captured during a survey are usually bundle adjusted as part of an aerial triangulation process in order to produce a refined solution for the parameters to an acceptable error threshold, typically using a reprojection error of 3D object space tie points and their corresponding observed features in image space. In performing aerial triangularization, any errors with the camera pose data can cause errors in determining the three-dimensional location of the feature points. Thus, it is desirable for the camera pose data to be as accurate as possible.

Typically, an aerial camera system uses global shutter (GS) type CMOS or CCD sensors because the entire sensor is exposed at the same time. However, such global shutter sensors require significant circuitry that results in a reduction in the available area for light capture, have relatively low radiometric performance, and require relatively high-power consumption, which ultimately reduces maximum frame rates and increases costs. An alternative to global shutter type sensors, and by far the majority of imaging sensors currently in use, are electronic rolling shutter (RS)-type sensors due to lower cost and superior performance.

In aerial triangularization, a large number of overlapping images are collected which collectively depict a particular geographic region. Feature points are identified and the two-dimensional location of the feature point in each of at least two overlapping images is extracted and matched. The matched feature points are converted to feature tracks and are triangulated to obtain an initial three-dimensional location of each of the feature tracks. The triangulated feature tracks are sent to a bundle adjustment process to adjust and refine the camera pose data for each of the images. Once the camera pose data is refined, the feature tracks can be analyzed again by an aerial triangulation process to obtain three-dimensional locations of the feature points having an increased accuracy in comparison to the initial three-dimensional locations.

A manual process can be used to identify feature points and then generate feature tracks; however, this process is extremely time consuming and results in very few feature points per image. With few feature points per image, the density of the point cloud after bundle adjustment is diminished, resulting in a lower resolution point-cloud.

Feature tracks have also been automatically generated. There is, however, often a large amount of error in this process. The previous methods for creating feature tracks are to generate as many as possible. However, this process often leads to having many tens of thousands of feature points per image. These feature points are then matched and triangulated to create a block of feature tracks. The number of feature tracks created in this process is difficult to predict. Performing a bundle adjustment on a large block of feature tracks is both computationally expensive and time consuming; however, if there are too few feature tracks, the results will lead to a poor adjustment. Finally, the feature tracks may contain bad matches and therefore lead to erroneous world point coordinates that create outliers in the bundle adjustment and increase the error of the solution.

One method known to increase the speed of a bundle adjustment is to remove images or remove measurement data from an image if there are other images that contain the same feature points. For example, if four images show at least one common feature point, the image with the fewest other feature points may be removed. While removal of images from consideration will speed the bundle adjustment process, there are a number of issues that are created. First, this method may arbitrarily lower the number of feature points in a feature track without considering the quality of the feature points, thereby increasing error in the bundle adjustment which would result in a low-quality point cloud solution. A second issue with this method is that connectivity may not be maintained across the geographic area. Further, this method does not account for a poor-quality feature point match when generating feature tracks. Rather, the conventional method would instead remove all feature points enclosed in the image which results in numerous feature tracks arbitrarily losing feature points. Lastly, this method does not account for adjusting a quality metric value based on the reprojection error of a feature track.

Another method known to increase the speed of the bundle adjustment process is to divide a geographic area into blocks and process each block independently. This process, however, can degrade the quality of the bundle adjustment and result in a degraded point cloud. For example, with a geographic area division scheme, some blocks may have a small number of images or feature points due to collection boundaries or low-detail, feature-sparse regions such as bodies of water.

Another method known to increase the speed of the bundle adjustment process is to reduce the number of feature tracks based on the reprojection error. Strict reprojection error-based filtering, however, would leave the aerial triangularization process vulnerable to excluding relevant areas in favor of feature-dense areas, whereas simple spatial filtering methods such as maxi-min would favor features in low-density areas to the detriment of quality. In effect this method fails to maintain spatial distribution across the geographic area and fails to ensure a quality bundle adjustment.

What is needed are automated methods and systems of selecting clusters of the highest quality feature tracks while maintaining connectivity between cluster selections across a geographic area to ensure a quality bundle adjustment of each cluster and greatly increase the speed of the aerial triangularization process in creating a point cloud of a geographic region.

SUMMARY

The problem of reducing bundle size while maintaining bundle adjustment accuracy is solved with the methods and systems described herein, including measuring image connectivity (e.g., image overlap and/or number of common features between pairs of overlapping images) and using the measured image connectivity to form clusters of images in which each cluster can be bundle adjusted separately.

In one exemplary implementation, a non-transitory computer readable medium may store computer executable instructions that when executed by a processor cause the processor to: identify a set of overlapping images depicting a geographic region; assign certain of the overlapping images into a cluster based on a connectivity of pairs of overlapping images; and conduct a bundle adjustment process on the images within the cluster.

In one exemplary implementation, a non-transitory computer readable medium may store computer executable instructions that when executed by a processor cause the processor to: identify a first image, a second image and a third image, the first image overlapping the second image and the third image, the second image overlapping the third image; determine a first connectivity between the first image and the second image; determine a second connectivity between the first image and the third image; determine a third connectivity between the second image and the third image, the second connectivity being less than the first connectivity, and the third connectivity being greater than the second connectivity; assign the first image, the second image, and the third image to a cluster based on the first connectivity and the third connectivity; conduct a bundle adjustment process on the cluster of the first image, the second image, and the third image.

In one exemplary implementation, connectivity may be determined by calculating a number of feature points shown in both the first image and the second image. In one exemplary implementation, connectivity may be determined by calculating an amount of geographic area depicted in both the first image and the second image.

In one exemplary implementation, a non-transitory computer readable medium may store computer executable instructions that when executed by a processor cause the processor to identify a plurality of images, each image in the plurality of images sharing one or more feature points with at least one other image in the plurality of images such that the plurality of images comprises a plurality of pairs of images; determine connectivity corresponding to each of the pairs of images by determining a quantity of the feature points shown in both of the images in the pair of images; determine a cluster of images from the plurality of images based on the determined connectivity; determine the cluster is above a predetermined bundle adjustment threshold; bi-section the cluster into a first sub-cluster and a second sub-cluster, the first sub-cluster and the second sub-cluster sharing at least one image of the cluster of images; determine the first sub-cluster is below the predetermined bundle adjustment threshold; and conduct a bundle adjustment process on the first sub-cluster.

In one exemplary implementation, the bundle adjustment threshold may be based on one or more of: a quantity of the images in the cluster, a quantity of feature points in the cluster, the determined connectivity, and a quality metric. The quality metric may be based on one or more of feature point quality and feature match quality. The feature point quality may be based on reprojection error. The feature match quality may be based on match error.

In one exemplary implementation, the processor may align the first sub-cluster with the second sub-cluster based on the at least one shared image.

In one exemplary implementation, the bundle adjustment process may comprise: building feature tracks of features from the images in the first sub-cluster; reducing a number of feature tracks in the first sub-cluster; and bundling the feature tracks. Reducing the number of feature tracks in the first sub-cluster may comprise removing feature tracks having a track quality metric that is below a track quality threshold. The track quality metric may be based on one or more of: a feature track triangularization quality, a feature point quantity within the feature track, a mean reprojection error for the feature track, and a quantity of feature tracks in the first sub-cluster. Reducing the number of feature tracks in the first sub-cluster may comprise removing feature tracks utilizing a spatial filter. Reducing the number of feature tracks in the first sub-cluster may comprise bi-sectioning the first sub-cluster into smaller sub-clusters having at least one overlapping image.

In one exemplary implementation, the processor may form a match graph comprising nodes indicative of the images in the cluster and edges between the nodes indicative of the connectivity between the images in the cluster. In one exemplary implementation, bi-sectioning the cluster may comprise utilizing a graph-cut algorithm on the match graph.

In one exemplary implementation, the processor may determine the second sub-cluster is below the predetermined bundle adjustment threshold; conduct the bundle adjustment process on the second sub-cluster; and align the first sub-cluster with the second sub-cluster based on the at least one shared image.

In one exemplary implementation, the processor may determine the second sub-cluster is above the predetermined bundle adjustment threshold; iteratively bi-section the second sub-cluster until bisected sub-clusters of the second sub-cluster are below the predetermined bundle adjustment threshold; conduct the bundle adjustment process on the bisected sub-clusters of the second sub-cluster; and align the bisected sub-clusters.

In one exemplary implementation, bi-sectioning of the cluster into the first sub-cluster and the second sub-cluster, may further comprise initially separating the cluster to form two initial sub-clusters that do not share any images and then expanding the two initial sub-clusters to include at least one image in a neighboring sub-cluster to create the first sub-cluster and the second sub-cluster, the first sub-cluster and the second sub-cluster sharing at least one image of the cluster of images.

BRIEF DESCRIPTION OF SEVERAL VIEWS OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
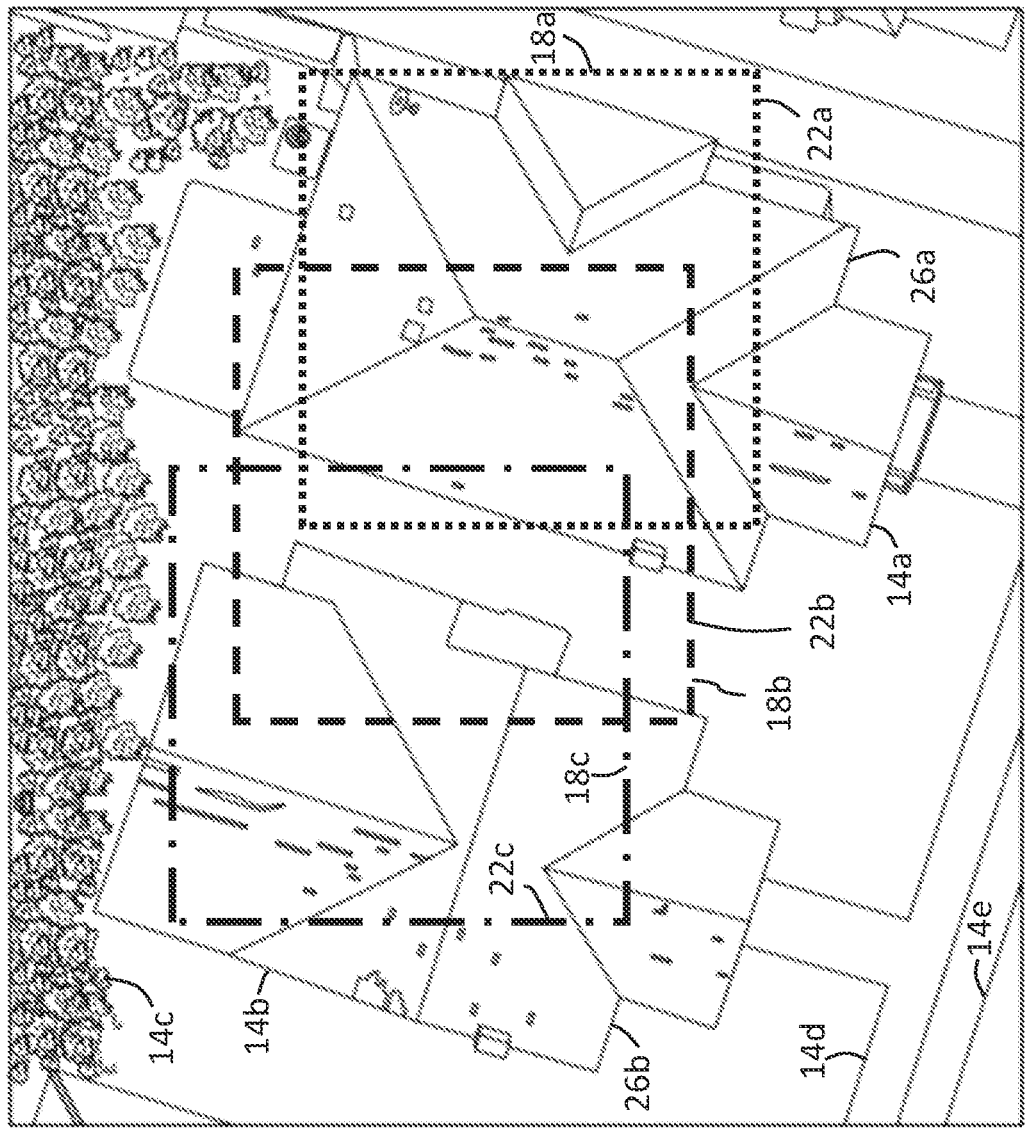
FIG. 1 is an exemplary aerial view of a geographic area showing three exemplary, overlapping images with each of the overlapping images depicting a section of the geographic area.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. For instance, although a geographic area that includes man-made objects, non-exclusive examples of which include buildings and infrastructure including roads, bridges, utility lines, pipelines, utility towers may be used as an example, the methods and systems may be used to reduce the bundle adjustment block size of a plurality of images of any feature, including natural features. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), a field programmable gate array (FPGA), a combination of hardware and software, and/or the like. The term "processor" as used herein means a single processor or multiple processors working independently or together to collectively perform a task.

Software may include one or more computer readable instructions, also referred to as executable code, that when executed by one or more components cause the component to perform a specified function. It should be understood that the algorithms described herein may be stored on one or more non-transitory computer readable medium.

Exemplary non-transitory computer readable mediums may include random access memory, read only memory, flash memory, and/or the like. Such non-transitory computer readable mediums may be electrically based, optically based, magnetically based, and/or the like. Non-transitory computer readable medium may be referred to herein as non-transitory memory.

The problem of increasing the speed and efficiency of bundle adjustment while ensuring a cohesive point cloud is solved with the methods and systems described herein, including reducing the bundle size by performing a bundle adjustment on a subset of images having a high connectivity between the images within the subset.

The strength of the connectivity between any two images is defined as the amount of overlap between the two images. Overlap may be defined as an amount of geographic area depicted in both of the two images or as a number of feature points depicted in both of the two images, or combinations thereof. For instance, in one embodiment, two images that have a high geographic overlap are said to exhibit a high level of connectivity, whereas in another embodiment, two images that have a high geographic overlap but do not share any feature points in common between the images are said to have low connectivity.

Referring now to FIG. 1, shown therein is an exemplary embodiment of an aerial view of a geographic area 10 having one or more objects 14, such as a first house 14a, a second house 14b, vegetation 14c, a sidewalk 14d, and a road 14e. Further shown is a projection of a first digital image 18a depicting a first geographic section 22a of the geographic area 10, a second digital image 18b depicting a second geographic section 22b of the geographic area 10, and a third digital image 18c depicting a third geographic section 22c of the geographic area 10. Each of the first, second, and third digital images 18a, 18b, and 18c may be selected from a plurality of digital images 18. Each of the first, second, and third digital images 18a, 18b, 18c overlaps with at least one other digital image 18. In some embodiments, each of the first, second, and third digital images 18a, 18b, and 18c overlaps partly, but not completely, with at least one other digital image 18. The object 14 can be any object of which a picture can be taken, for example a man-made object such as a structure, road, pool, utility pole, or pond; or a natural object such as a hill, cliff, vegetation, creek, or mountain, for example. Each of the digital images 18 comprises pixels that may be arranged in a grid format.

The geographic area 10 can be any geographic area to be analyzed, and is shown by way of example as a section of a housing addition. The first house 14a and the second house 14b include a first house roof 26a and a second house roof 26b, respectively. In some cases, the first house roof 26a and/or the second house roof 26b may include a feature such as a flaw, and/or the first house roof 26a and the second house roof 26b may have identifiable features, such as a vertex, a corner of a roof plane, a point of a gable or hip, etc.

In some embodiments, the geographic area 10 may be feature-sparse, that is, the geographic area 10 may include few, if any, identifiable or unique features. For example, a feature-sparse geographic area may be a natural environment, such as a water basin or a uniform vegetation area, such as grasslands. In some embodiments, the geographic area 10 may be considered feature-dense if the geographic area 10 includes many identifiable features in close proximity to one another.

In one embodiment, each of the digital images 18 may be taken of a geographic area 10 with a sensor, such as a camera, from an aerial perspective over the geographic area 10, or from a ground-based perspective. With respect to an aerial perspective, the digital images 18 can be from an overhead viewpoint, also referred to as an ortho view or nadir view, typically taken directly below and/or vertically downward from the camera lens positioned above the geographic area 10 (FIG. 1), or an aerial oblique view. An aerial oblique view may be taken from approximately 10 degrees to 75 degrees from a nadir direction. In one embodiment, certain of the images 18 may be nadir, and some of the images 18 may be captured from different oblique angles. For example, the first image 18a may be an aerial nadir image, the second image 18b may be an aerial oblique image taken from approximately 10 degrees from the nadir direction, and the third image 18c may be an aerial oblique image taken from approximately 20 degrees from the nadir direction.

In one embodiment, the sensor can be oriented and located in various orientations and locations, such as street view, satellite, automotive based, unmanned aerial vehicle based, and/or manned aerial vehicle based. Image data may contain nominal "visible-band" (e.g., red, green, blue) wavelength spectral data or other spectral bands data (e.g., infrared wavelength spectral data or ultraviolet wavelength spectral data). The images 18 can be captured independently at different instances of time, or at least some of the images 18 can be captured simultaneously using multiple cameras. The images 18 can be captured through the use of a global shutter in which all of the sensors within the camera are exposed simultaneously, a rolling shutter in which different scanlines in the sensor are exposed at different times, or combinations thereof. In one embodiment, one or more of the images 18 can be a synthetic global shutter image created from a rolling shutter image, or combinations thereof. An exemplary synthetic global shutter image is disclosed in the patent application identified by U.S. patent application Ser. No. 16/343,610 (Pub. No. US2020/0059601A1), entitled "An Image Synthesis System", which is a national stage filing of PCT/AU2017/051143, both of which are hereby incorporated in their entirety herein.

Exemplary image capture systems that can be used to capture the images 18 are disclosed in U.S. Pat. Nos. 7,424,133, 8,385,672, and U.S. patent application Ser. No. 16/226,320 (Pub. No. US2020/0059601A1), the entire contents of each of which are hereby incorporated herein by reference.

In one embodiment, each of the images 18 has a unique image identifier such as by use of metadata, or otherwise stored in such a way that allows a computer system 150 (FIG. 4) to definitively identify each of the images 18.

Figure 2:
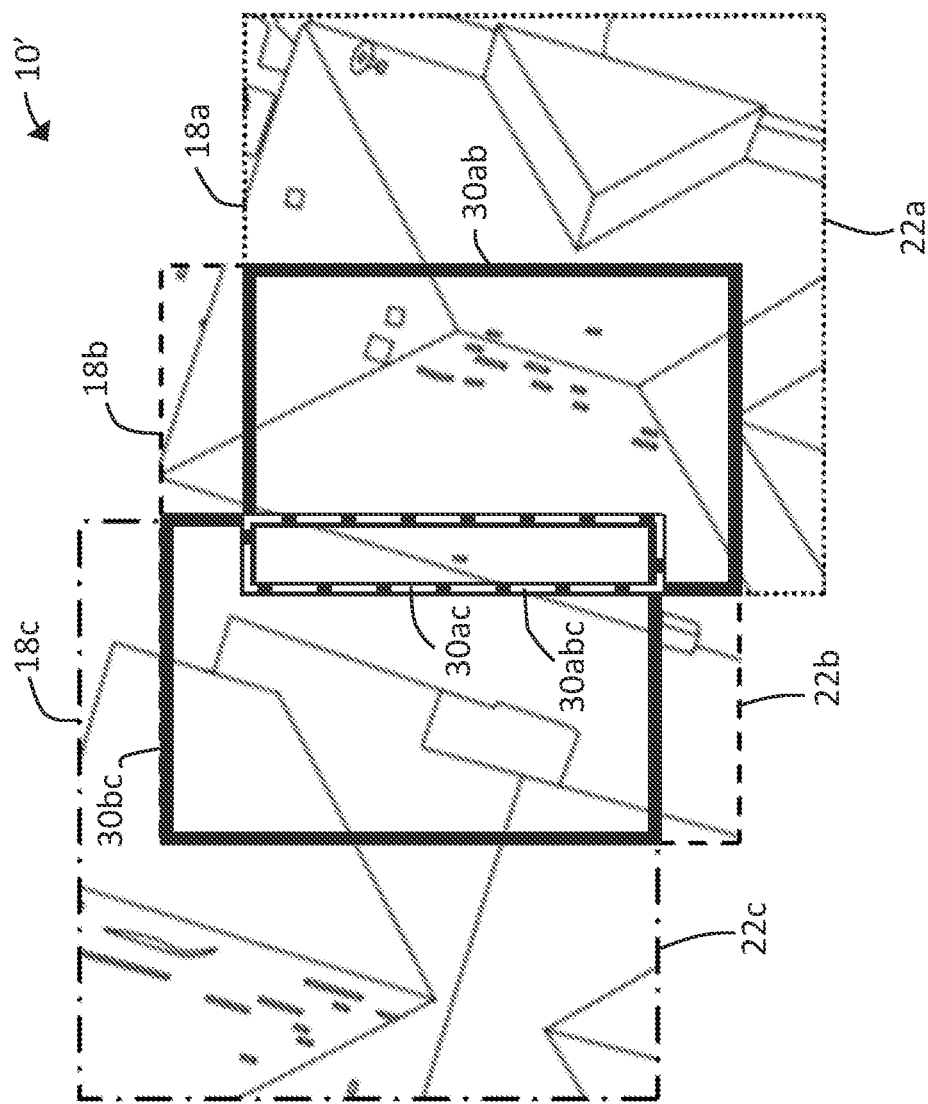
FIG. 2 is an exemplary illustration of the three exemplary, overlapping images having geographic overlap.

Referring now to FIG. 2, shown therein are the first image 18a, the second image 18b, and the third image 18c overlapping one another such that the first, second, and third geographic sections 22a, 22b, 22c depicted by the first, second, and third images 18a, 18b, 18c create a continuous geographic sub-area 10' when combined.

The overlap between the first image 18a and the second image 18b form a first geographic overlap 30ab. The overlap of the first image 18a, the second image 18b, and the third image 18c form a second geographic overlap 30abc. The overlap of the second image 18b and the third image 18c form a third geographic overlap 30bc.

In one embodiment, the first geographic overlap 30ab may be defined as the intersection of the first geographic section 22a with the second geographic section 22b. The second geographic overlap 30abc may be defined as the intersection of the first geographic section 22a with the second geographic section 22b and with the third geographic section 22c. The third geographic overlap 30bc may be defined as the intersection of the second geographic section 22b with the third geographic section 22c.

The intersection of the first geographic section 22a with the third geographic section 22c, as shown in FIG. 2, also forms a fourth geographic overlap 30ac. However, in the exemplary embodiment shown in FIG. 2, the second geographic section 22b entirely overlaps the fourth geographic overlap 30ac. Therefore, the fourth geographic overlap 30ac is, in this case, equivalent to the second geographic overlap 30*abc*. In other embodiments, it may be the case that the intersection between all of the images 18 is not equivalent to the intersection of any other permutation of the images 18.

Figure 4:
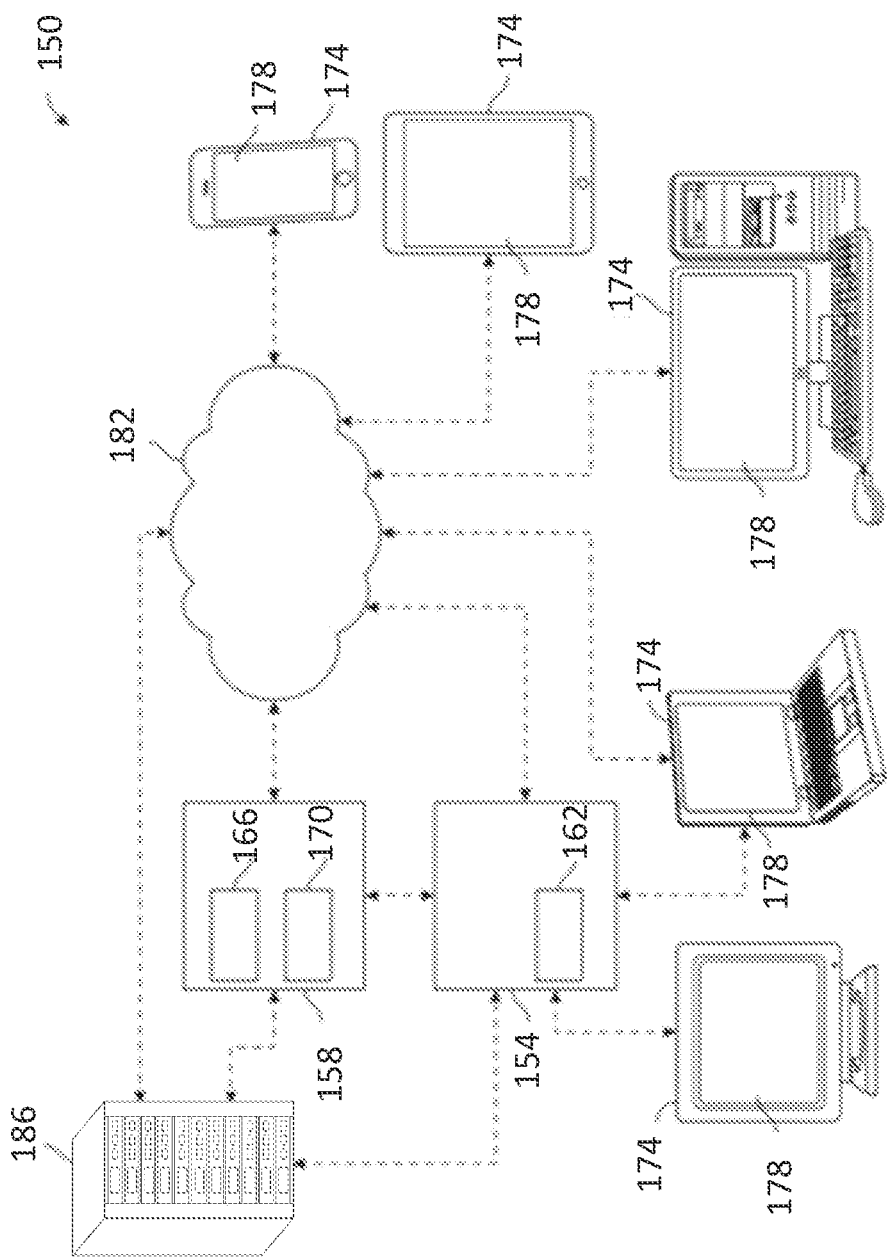
FIG. 4 is a schematic diagram of an exemplary computer system in accordance with the present disclosure.

In one embodiment, the images 18 may be geo-referenced, that is, processed such that pixels in the image 18 have a determined geo-location, such as X, Y, and Z coordinates and/or latitude, longitude, and elevation coordinates. See, e.g., U.S. Pat. No. 7,424,133 that describes techniques for geolocating oblique images and measuring within the oblique images. In some implementations, the images 34 may be georeferenced using the techniques described in U.S. Pat. No. 7,424,133, and/or using the techniques described in U.S. patent application Ser. No. 16/343,610 (Pub. No. US2020/0059601A1, a national stage filing of WO2018071983) titled "An Image Synthesis System," the entire contents of all of which are hereby incorporated herein by reference. The geo-location data can be stored as metadata within the images 18 or stored separately from the images 18 and related to the images 18 using any suitable technique, such as unique identifiers or through the use of a database, which may be stored in and/or accessed by the computer system 150 (FIG. 4). In one embodiment, the coordinates are world point coordinate specified by three space coordinates, and optionally a time coordinate.

In one embodiment, the area of a particular geographic overlap 30 may be calculated by determining the pixels of a reference image 18 that overlap with another image 18, and using geo-location data of the reference image 18 to determine the area of the geographic overlap 30.

In one embodiment, if the first image 18*a* and the second image 18*b* have the same pixel resolution, that is, if each pixel within the first image 18*a* and each pixel within the second image 18*b* represent an equivalent area of real-world geography, then the area of the first geographic overlap 30*ab* is calculated by determining the pixels of the first image 18*a* that overlap with the second image 18*b* and using geo-location data of a reference image, the reference image being either the first image 18*a* or the second image 18*b*, to determine the area of the geographic overlap 30*ab*.

However, if the first image 18*a* and the second image 18*b* have differing pixel resolutions, that is, each pixel of the first image 18*a* and each pixel of the second image 18*b* do not represent an equivalent area of real-world geography, then the calculation of the area of the first geographic overlap 30*ac* may account for differing resolutions, and thus account for measurement error. For example, to account for the differing resolutions, the area of the first geographic overlap 30*ac* may be calculated by averaging the geographic area determined with the first image 18*a* as the reference image with that of the second image 18*b* as the reference image. In the example shown in FIG. 2, the first geographic overlap 30*ab* may be calculated by determining the pixels of the first image 18*a* that overlap with the second image 18*b* and using the geo-location data of the first image 18*a* to determine the area of the first geographic overlap 30*ab* depicted in the pixels.

Figure 3:
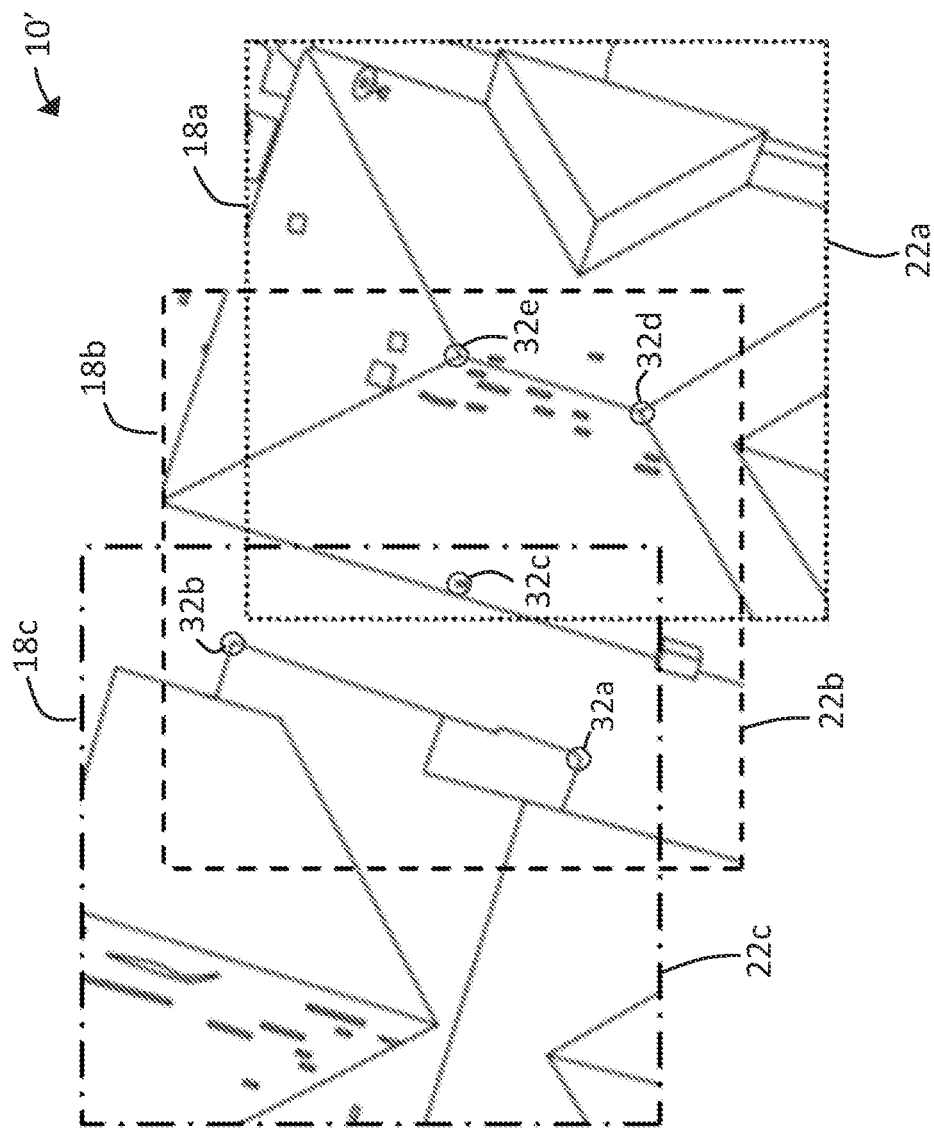
FIG. 3 is an exemplary illustration of the three exemplary, overlapping images with common feature points forming feature tracks.

As described above, connectivity may also be defined as the number of feature points 32 in common between any two of the images 18, that is, the number of feature points 32 appearing in both of the images 18. Referring now to FIG. 3, shown therein are the first image 18*a* depicting the first geographic section 22*a*, the second image 18*b* depicting the second geographic section 22*b*, and the third image 18*c* depicting the third geographic section 22*c*, aligned and overlapping one another such that the combined first, second, and third geographic sections 22*a*, 22*b*, 22*c* form the continuous geographic sub-area 10'.

Further, shown in FIG. 3 are a first feature point 32*a*, a second feature point 32*b*, a third feature point 32*c*, a fourth feature point 32*d*, and a fifth feature point 32*e*. The feature points 32 are circled in FIG. 3 for explanatory purposes. In this example, the first image 18*a* depicts the third, fourth, and fifth feature points 32*c*, 32*d*, and 32*e*; the second image 18*b* depicts the first, second, third, fourth, and fifth feature points 32*a*, 32*b*, 32*c*, 32*d*, and 32*e*; and, the third image 18*c* depicts the first, second, and third feature points 32*a*, 32*b*, and 32*c*. It should be noted that, for the sake of brevity, only five feature points 32 are shown, however, the number of feature points 32 depicted within any image 18 may be more or less than five and may range from zero to the number of pixels within the image 18.

The first image 18*a* depicts the third feature point 32*c*, the fourth feature point 32*d*, and the fifth feature point 32*e*, each feature point 32 having a first pixel location being the pixel location of the feature point 32 within the first image 18*a*. The second image 18*b* depicts the first feature point 32*a*, the second feature point 32*b*, the third feature point 32*c*, the fourth feature point 32*d*, and the fifth feature point 32*e*, each feature point 32 having a second pixel location being the pixel location of the feature point 32 within the second image 18*b*. And the third image 18*c* depicts the first feature point 32*a*, the second feature point 32*b*, and the third feature point 32*c*, each feature point 32 having a third pixel location being the pixel location of the feature point 32 within the third image 18*c*.

Each feature point 32 is any identifiable feature of the one or more object 14. Each feature point 32 comprises at least an image identifier and a pixel coordinate pair. The pixel coordinate pair is a pixel location within the image 18 described as the number of pixels along an X-axis and the number of pixels along a Y-axis. So long as the direction used for counting pixels along either the X-axis or the Y-axis is consistent for all feature points 32 across all images 18 in a bundle adjustment, the number of pixels along the Y-axis may be counted in one of either a downwards direction (i.e., from the top of the image 18 to the row of pixels containing the feature point) or an upwards direction, and the number of pixels along the X-axis may be counted in one of either a leftwards direction (i.e., from the right of the image 18 to the column of pixels containing the feature point) or a rightwards direction.

Referring now to FIG. 4, shown therein is the computer system 150 designed to carry out a smart block bundle reduction method 100 (FIGS. 5-12). The computer system 150 may comprise one or more computer processors 154 and one or more non-transitory computer-readable medium 158. The computer system 150 may further comprise one or more communication component 162. The one or more non-transitory computer-readable medium 158 may store one or more database 166 and program logic 170. The one or more database 166 may comprise the images 18 and/or other data. Though it will be understood that the images 18 may be provided from outside sources and/or stored elsewhere.

The computer system 150 may bi-directionally communicate with a plurality of user devices 174, which may or may not have one or more screens 178, and/or may communicate via a network 182. The one or more computer processors 154 may or may not necessarily be located in a single physical location.

In one embodiment, the non-transitory computer-readable medium 158 stores the program logic 170, for example, a set of instructions capable of being executed by the one or more computer processors 154, that when executed by the one or more computer processor 154 causes the one or more computer processors 154 to carry out the smart block bundle reduction method 100 and/or other functions.

In one embodiment, the network 182 is the Internet and the user devices 174 interface with the system via the communication component 162 and a series of web pages. It should be noted, however, that the network 182 may be almost any type of network and may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, a 5G network, a satellite network, a radio network, an optical network, a cable network, an Ethernet network, combinations thereof, and/or the like.

In one embodiment, the computer system 150 comprises a server system 186 having multiple servers in a configuration suitable to provide a commercial computer-based business system such as a commercial web-site and/or data center.

Figure 5:
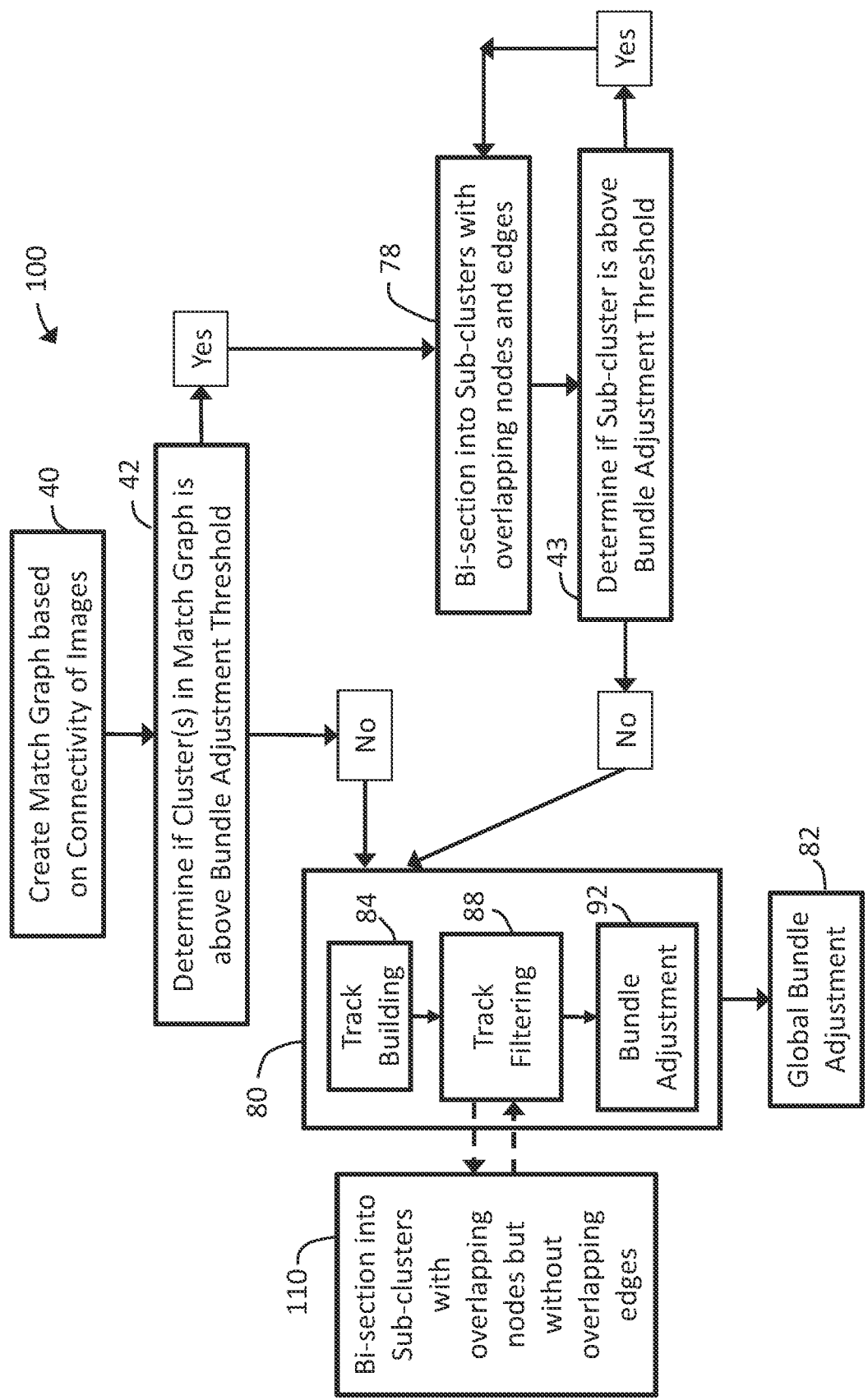
FIG. 5 illustrates an exemplary smart block bundle reduction method in accordance with the present disclosure.

FIG. 5 illustrates an exemplary smart block bundle reduction method 100, which may comprise computer executable code stored in the non-transitory computer-readable medium 158, that when executed by the one or more computer processors 154 causes the one or more computer processors 154 to carry out one or more functions, comprising: a match-graph process 40 (FIG. 6), determining if a particular cluster 70 from a match graph 44 is above a bundle adjustment threshold at a step 42, and, if not, then carrying out a bundle adjustment process 80 (FIG. 9) on the cluster 70. The bundle adjustment threshold is a maximum. If the cluster 70 is below that maximum, then the one or more computer processors 154 carry out the bundle adjustment process 80.

The smart block bundle reduction method 100 further comprises, if the particular cluster 70 is above the bundle adjustment threshold, then the one or more computer processors 154 may carry out a cluster bi-sectioning process 78 (FIG. 8) in order to bi-section the cluster 70 into sub-clusters 74. Then the one or more computer processors 154 may determine if a particular sub-cluster 74 is above the bundle adjustment threshold at a step 43, and, if not, carry out the bundle adjustment process 80 on the sub-cluster 74. If the particular sub-cluster 74 is above the bundle adjustment threshold, then the one or more computer processors 154 may iteratively carry out the cluster bi-sectioning process 78 in order to bi-section the sub-cluster(s) 74 into smaller sub-clusters 74 until the sub-cluster(s) are below the bundle adjustment threshold, and then bundle adjust those sub-clusters 74. In general, the bundle adjustment process 80 may comprise track building 84, track filtering 88, and bundle adjustment 92. In some implementations, track building 84 may include a track-building sub-sectioning process 110. In some implementations, the smart block bundle reduction method 100 may further comprise the one or more computer processors 154 carrying out a global bundle adjustment 82 (FIG. 12) to align the clusters 70 and/or sub-clusters 74 after the bundle adjustment process 80 based on overlapping nodes, such as from the match graph 44.

In some implementations, the one or more computer processors 154 may carry out and/or update an aerial triangulation process based on the results of the smart block bundle reduction method 100.

The results of the smart block bundle reduction method 100 improve georeferencing accuracy of the images 18. In some implementations, the smart block bundle reduction method 100 may further comprise the one or more computer processors 154 carrying out improved aerial triangulation on the images 18 based on the results of the smart block bundle reduction method 100. The results of the aerial triangulation improve accuracy of camera parameters associated with the images 18, and therefore improve other processes thereafter, such as creating image mosaics and other image processing or image products.

Figure 6:
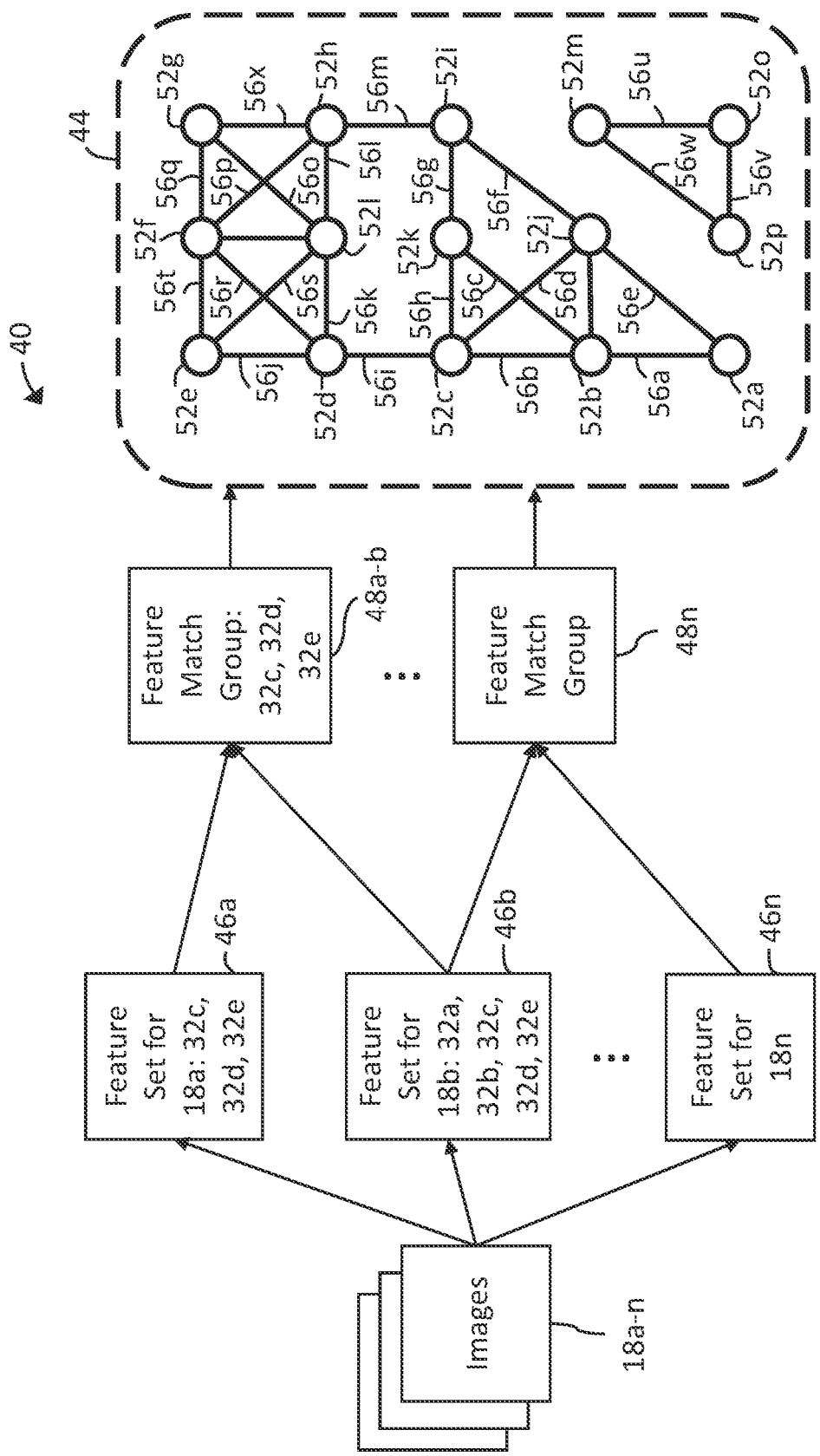
FIG. 6 is an exemplary process diagram depicting creating a match graph from a set of images.

Referring now to FIG. 6, shown therein is a process diagram of a portion of the smart block bundle reduction method 100 depicting the match-graph process 40 to create a match graph 44 from the images 18. In the match-graph process 40, first, the one or more computer processors 154 may identify one or more of the feature points 32*a-n* for each image 18 in a set of the images 18*a-n*. The one or more computer processors 154 may thereby form one or more feature sets 46*a-n* for each image 18.

Next, the one or more computer processors 154 may identify all feature matches for each pair of images 18 (that is, identify the same feature point(s) 32 that appear in a first of a pair of images 18 that appear in a second in the pair of images 18), and thereby form feature match group(s) 48. The one or more computer processors 154 may determine the feature match between two images 18 by identifying a first feature point 32*a* in a first feature set 46*a* and correlating the first feature point 32*a* to a second feature point 32*b* in a second feature set 46*b*. The correlation may be conducted by comparing geo-location information for the first feature point 32*a* with geo-location information for the second feature point 32*b*, such as that available from the geo-referenced image 18 or from other sources. In some embodiments the correlation may be conducted by analyzing the feature points 32 in the geographic overlap 30 areas.

The one or more computer processors 154 may form the first feature match group 48*a-b* having the third, fourth, and fifth feature points 32*c*, 32*d*, 32*e* by comparing the first feature set 46*a* of the first image 18*a* (having the third, fourth, and fifth feature points 32*c*, 32*d*, 32*e*) with the second feature set 46*b* from the second image 18*b* (having the first, second, third, fourth, and fifth feature points 32*a*, 32*b*, 32*c*, 32*d*, 32*e*) to identify the matching feature points 32, which in this example are the third, fourth, and fifth feature points 32*c*, 32*d*, 32*e*. In one embodiment, the one or more computer processors 154 may determine the first feature match group 48*a-b* based on the intersection of the first feature set 46*a* with the second feature set 46*b*.

The one or more computer processors 154 may form additional feature match groups 48 by forming additional feature sets 46 from additional images 18, and comparing the feature sets 46 between two of the additional images 18.

Next in the match-graph process 40, the one or more computer processors 154 may form the match graph 44 based on connectivity between the images 18. The one or more computer processors 154 may generate the match graph 44 comprising one or more nodes 52*a-n* and one or more edges 56*a-n*. Each node 52 may represent a single image 18 and each edge 56 may represent the connectivity between two of the images 18 represented by the nodes 52.

The connectivity may be determined by the number and/or quality of feature matches between the respective nodes 52, such as in the feature match groups 48, such as shown in FIG. 6. The connectivity may also (or alternatively) be determined by other metrics, including geographic overlap, and/or a combination of metrics. Additionally, for brevity, the match graph 44 is shown as a two-dimensional match graph; however, the dimensionality of the match graph 44 may be determined based on, among other properties, the strength of the connectivity of edges 56 between the nodes 52. Further, the match graph 44 in FIG. 6 shows a certain number of nodes 52 and edges 56, but it will be understood that the match graph 44 may contain more or fewer of the nodes 52 and/or edges 56.

In some implementations, a cluster 70 is defined as a set of nodes 52 and edges 56 in which all of the nodes 52 are connected to one another by the edges 56. If all of the nodes 52 in the match graph 44 are connected to one another by the edges 56, then the entire match graph 44 may be considered a single cluster 70.

Figure 7:
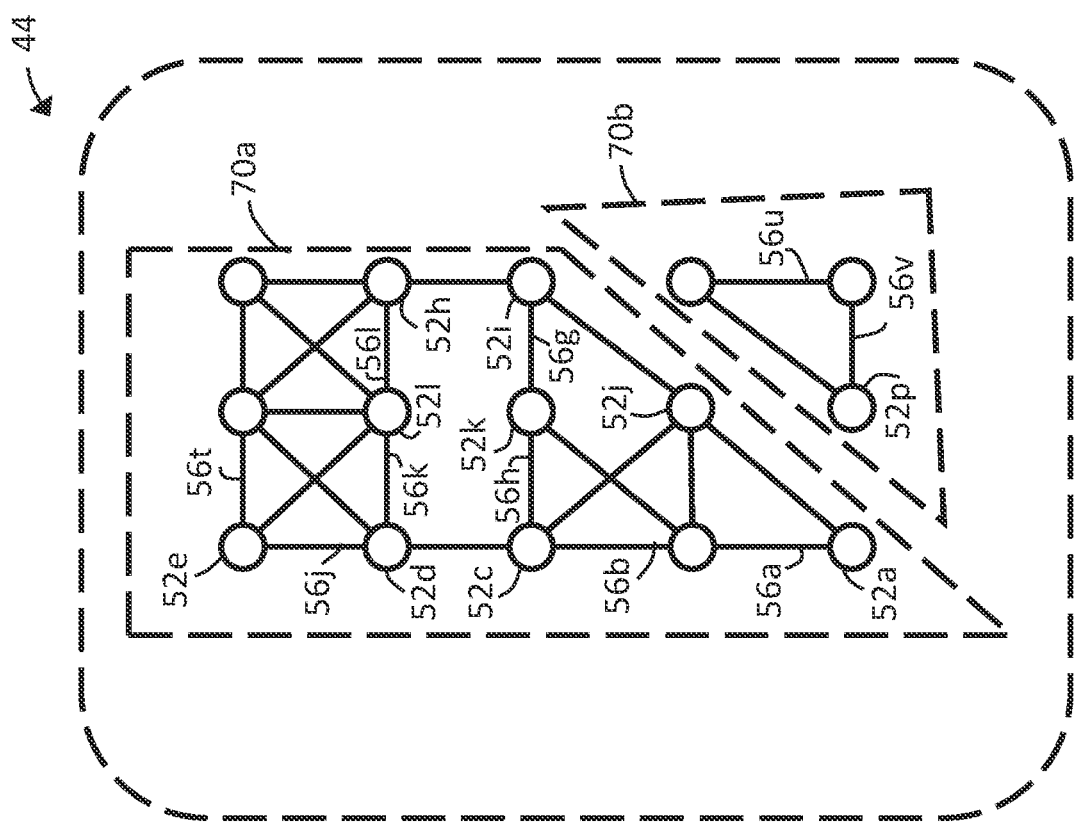
FIG. 7 is an exemplary embodiment of a match graph having more than one cluster.

FIGS. 6 and 7 illustrate an exemplary match graph 44 having a first cluster 70*a* and a second cluster 70*b*. Each of the clusters 70 may be a subset of the match graph 44 and may comprise the nodes 52*a-n* connected to every other node 52*a-n* by a series of edges 56*a-n*. (Not all of the nodes 52 or the edges 56 in the first cluster 70*a* and the second cluster 70*b* in FIG. 7 are labeled for the sake of clarity.)

The clusters 70 are not connected to one another by any of the edges 56. Because there is no connectivity between the clusters 70, such as the first cluster 70*a* and the second cluster 70*b*, then each of the clusters 70, such as the first cluster 70*a* and the second cluster 70*b*, can be processed and bundle adjusted separately from any other cluster 70. As shown in FIG. 7, the first cluster 70*a* shares no edges 56 with the second cluster 70*b*, because there is no connectivity between the first cluster 70*a* and the second cluster 70*b*. Therefore, the first cluster 70*a* may be bundle adjusted separately from the second cluster 70*b*.

The one or more computer processors 154 may determine if the cluster(s) 70 exceed a predetermined bundle adjustment threshold. The bundle adjustment threshold may be based on the number of images 18, the size of the feature match groups 48, the connectivity between the nodes 52, or a quality metric, or some combination thereof. The quality metric may be based on feature point quality, such as reprojection error, or feature match quality, such as match error. The bundle adjustment threshold may be supplied by a user through any of a plurality of user devices or may be calculated by the computer system 150.

In this example, the first cluster 70*a* is above a predetermined bundle adjustment threshold and the second cluster 70*b* is below the bundle adjustment threshold. Because the first cluster 70*a* exceeds the bundle adjustment threshold, the first cluster 70*a* is bi-sectioned as described below. However, because the second cluster 70*b* is below the bundle adjustment threshold, the second cluster 70*b* may proceed to a bundle adjustment process 80, described below and depicted in FIG. 9.

Figure 8:
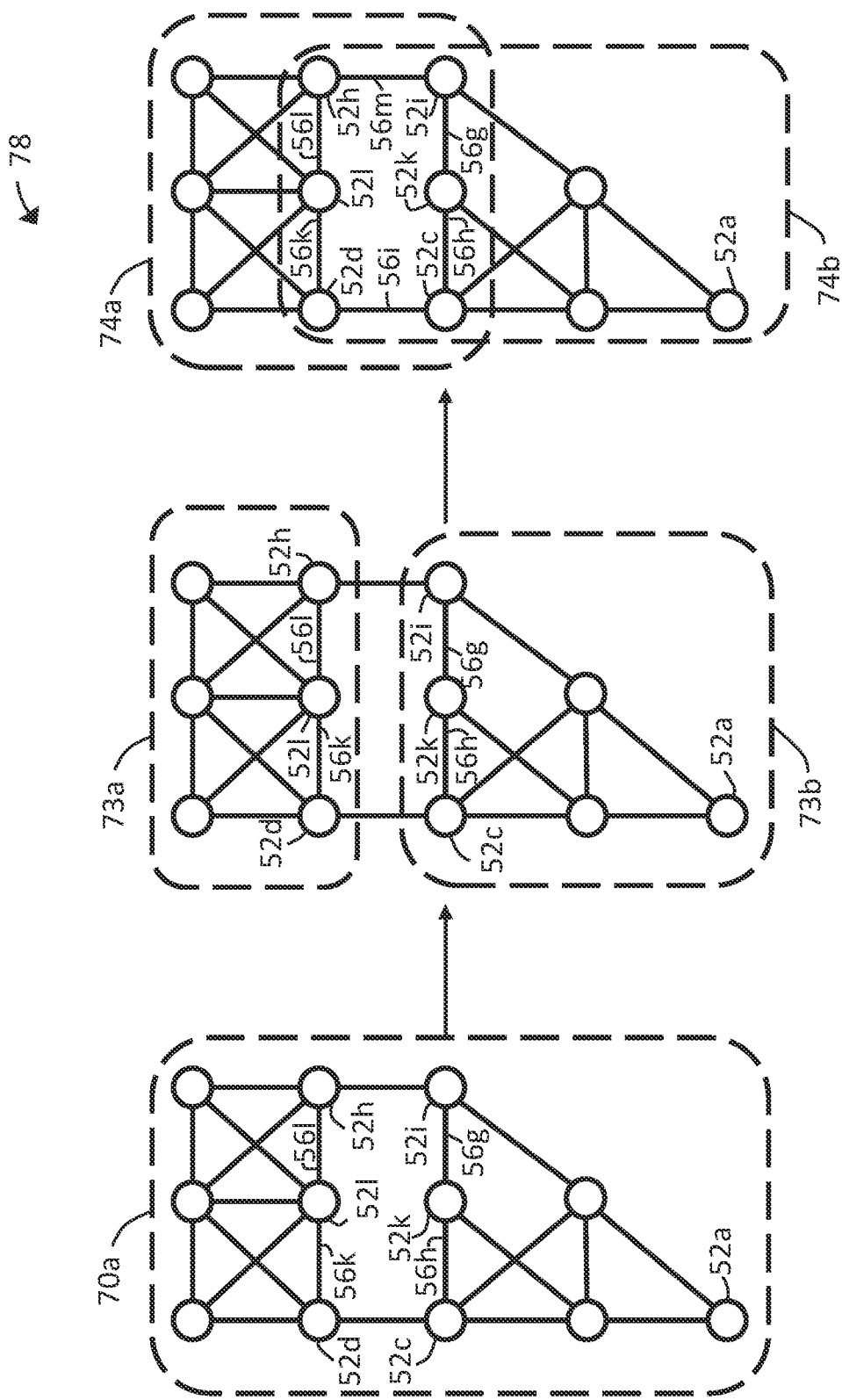
FIG. 8 is an exemplary embodiment of a bi-sectioning diagram illustrating the formation of sub-clusters from a cluster.

Referring now to FIG. 8, shown therein is a bi-sectioning diagram illustrating the cluster bi-sectioning process 78 of the first cluster 70*a* into a first sub-cluster 74*a* and a second sub-cluster 74*b*. The cluster bi-sectioning process 78 may utilize a graph-cut algorithm to bisect the clusters 70. (For clarity, not all of the nodes 52 and the edges 56 are numbered in FIG. 8.) In general, in one implementation, to bisect a particular cluster 70, the one or more computer processors 154 may first separate the cluster 70 to form two or more initial sub-clusters 73 that do not share any nodes 52, then expand the initial sub-clusters 73 to include one or more node 52 in a neighboring sub-cluster 73, to create the resulting sub-clusters 74 having overlapping nodes 52. The resulting sub-clusters 74 may also have overlapping edges 56.

In the example shown in FIG. 8, the one or more computer processors 154 may first form a first initial sub-cluster 73*a* and a second initial sub-cluster 73*b*, wherein each of the first and second initial sub-clusters 73 does not contain any nodes 52 present in another of the initial sub-clusters 73. Then, the one or more computer processors 154 may expand the first initial sub-cluster 73*a* and the second initial sub-cluster 73*b* to include one or more node 52 in a neighboring initial sub-cluster 73, thereby forming the first sub-cluster 74*a* and the second sub-cluster 74*b*. In the example shown in FIG. 8, the resulting first sub-cluster 74*a* and the resulting second sub-cluster 74*b* both share six of the nodes 52*c*, 52*d*, 52*l*, 52*h*, 52*i*, 52*k* and six of the edges 56*k*, 56*l*, 56*m*, 56*g*, 56*h*, 56*i*. Having overlap between each resulting sub-cluster 74, that is having at least one node 52 in common between the first sub-cluster 74*a* and the second initial sub-cluster 73*b* and having at least one node 52 in common between the second sub-cluster 74*b* and the first initial sub-cluster 73*a*, ultimately enables precise reconstruction of each sub-cluster 74 after bundle adjustment into the global bundle adjustment solution.

In one embodiment, the one or more computer processors 154 may compare the first initial sub-cluster 73*a* and the second initial sub-cluster 73*b* to the bundle adjustment threshold, and, if the first initial sub-cluster 73*a* or the second initial sub-cluster 73*b* exceeds the bundle adjustment threshold, then the initial sub-cluster 73 is again bisected. This process may be repeated iteratively until each bi-sectioned sub-cluster 74 is under the bundle adjustment threshold.

Once the cluster 70 or the sub-cluster 74 is under the bundle adjustment threshold, the one or more computer processor 154 may execute the bundle adjustment process 80 on the cluster 70 or the sub-cluster 74.

Figure 9:
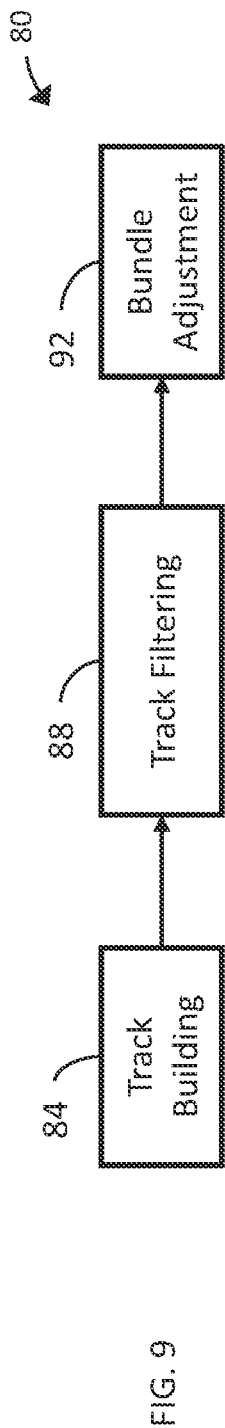
FIG. 9 is a diagram of an exemplary embodiment of a sub-cluster bundle adjustment process.

Referring now to FIG. 9, shown therein is the bundle adjustment process 80, which generally comprises the following steps carried out by the one or more computer processors 154: track building (step 84), track filtering (step 88), and bundle adjustment (step 92). In one embodiment, the bundle adjustment process 80 is performed by the one or more computer processors 154 in series, that is, the bundle adjustment process 80 is performed consecutively such that the bundle adjustment process 80 is performed on a first selection of tracks (such as in a cluster 70 or sub-cluster 74) at a first instance in time and then the bundle adjustment process 80 is performed on a second selection of tracks (such as in a cluster 70 or sub-cluster 74) at a second instance in time, the first instance in time occurring before the second instance in time. In an alternative embodiment, the bundle adjustment process 80 is performed in parallel, that is, the bundle adjustment process 80 is performed on one or more collection of tracks (such as in a cluster 70 or sub-cluster 74) at the same time, such that the bundle adjustment process 80 is performed on a first selection of tracks at a first instance in time and the bundle adjustment process 80 is performed on a second selection of tracks at a second instance in time, the first instance in time occurring at the same time, before, or after the second instance in time.

Figure 10:
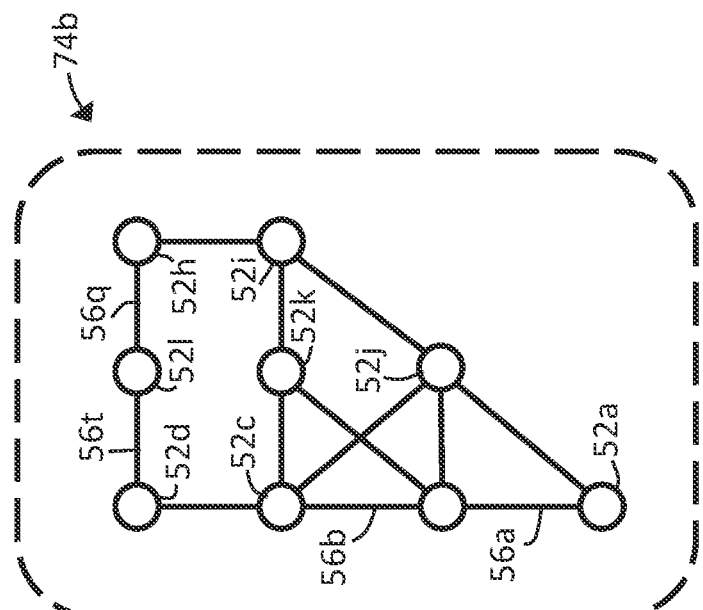
FIG. 10 is an exemplary embodiment of a sub-cluster in accordance with the present disclosure.

In one embodiment, track building (step 84) comprises the one or more computer processors 154 forming one or more track from the feature points 32 within each of the feature match groups 48 of the sub-cluster 74 (such as the second sub-cluster 74*b* shown in FIG. 10). Each feature track is a collection of feature points 32 having a substantially similar geolocation. Thus, each feature track is a set of a unique image identifier and pixel coordinate pair of feature point 32*a-n* in each image 18 of the sub-cluster 74*b* and a geographic coordinate.

Figure 11:
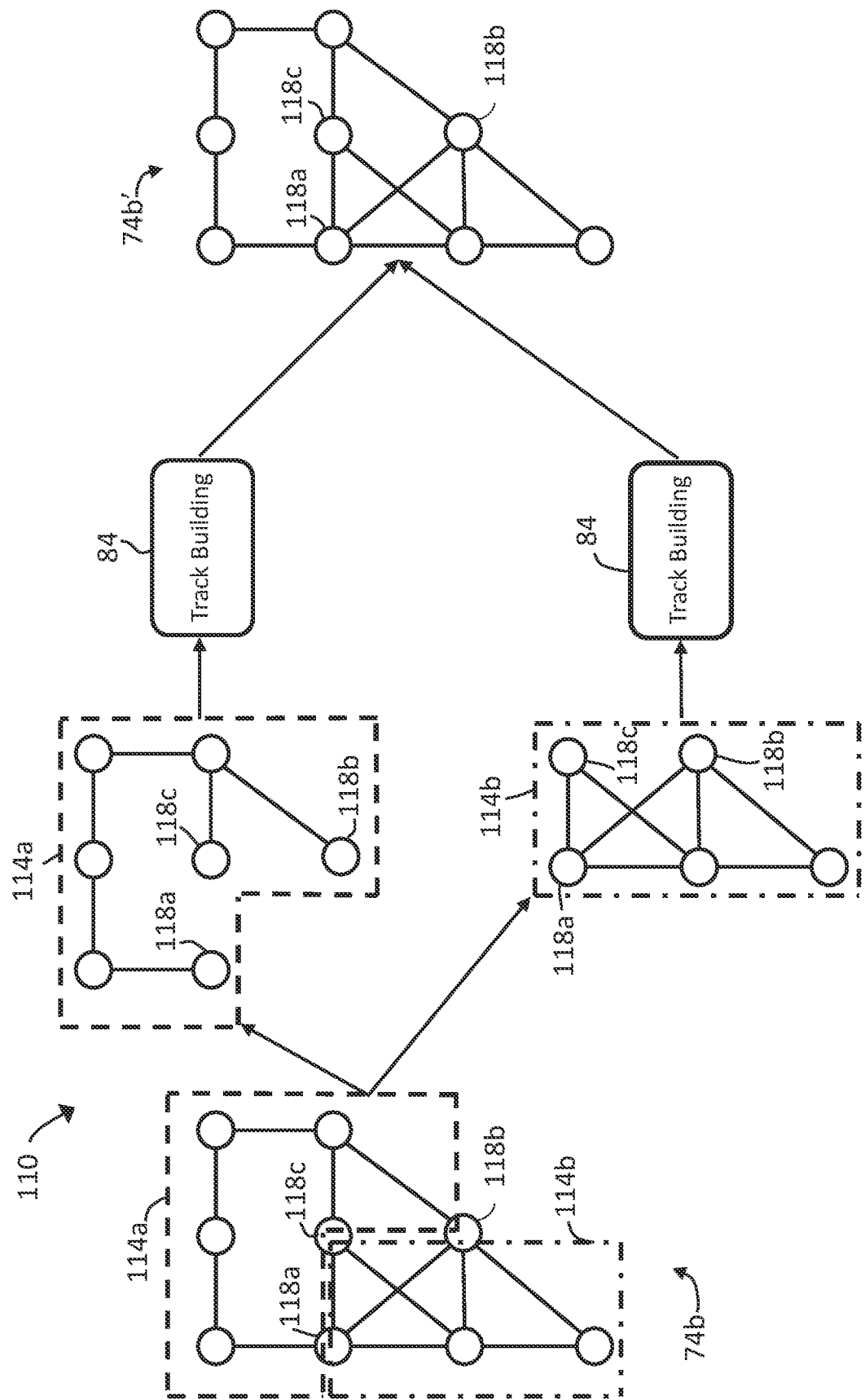
FIG. 11 is a diagram of an exemplary embodiment of a track building process.

For example, referring back to FIG. 3, a first feature track may comprise the geographic coordinate of feature point 32a, a first pair having the unique image identifier for the third image 18c and the pixel coordinates for the first feature point 32a in the third image 18c, and a second pair having the unique image identifier for the second image 18b and the pixel coordinates for the first feature point 32a in the second image 18b. Additionally, a second feature track may comprise the geographic coordinate of the third feature point 32c, a first pair having the unique image identifier for the third image 18c and the pixel coordinates for the third feature point 32c in the third image 18c, a second pair having the unique image identifier for the second image 18b and the pixel coordinates for the third feature point 32c in the second image 18b, and a third pair having the unique image identifier for the first image 18a and the pixel coordinates for the third feature point 32c in the first image 18a. A geographic coordinate may be a world point coordinate, that is, a geolocated point on the earth in any coordinate system. In one embodiment, a geographic coordinate may be triangulated by using location information calculated from each of the feature points 32 of the feature track. In one embodiment, track building may be performed on track clusters 114 as shown in FIG. 11 and described in detail below.

In one embodiment, track building may be accomplished by including each of the feature points 32 in a dataset (or data file) correlated with a feature track. In some embodiments, the feature points 32 may be stored in one or more database, such as one or more database in the non-transitory computer-readable medium 158. The database may have a feature track field that is configured to receive a feature track identifier indicative of a particular one of the feature tracks. In these embodiments, the one or more feature points 32 can be assigned to the feature track by storing the feature track identifier identifying the particular one of the feature tracks in the feature track field. Similarly, one or more of the feature points 32 can be removed from a particular one of the feature tracks by deleting the feature track identifier from the feature track field, or removing the information describing the feature point 32 from the dataset or data file correlated with the feature track. In one embodiment, the feature track identifier is determined based on the geo-location of the feature track.

Returning to FIG. 9, the track filtering (step 88) may comprise the one or more computer processors 154 reducing the number of tracks processed for bundle adjustment. The number of tracks may be reduced by removing any track having a quality metric that is below a track quality threshold. Additionally, or alternatively, the tracks may be filtered utilizing a spatial filter such as described in U.S. Provisional Patent Application No. 62/858,728 and U.S. patent application Ser. No. 16/895,858, entitled "Using Spatial Filter to Reduce Bundle Adjustment Block Size", the entire contents of each of which are hereby incorporated by reference.

Generally, for the track filtering 88, at least one quality metric may be assessed for each feature track. The quality metric may be determined based on at least one of: a feature track triangularization quality, a feature point quantity within the feature track, a mean reprojection error for each feature track, and a quantity of feature tracks in the cluster 70 or the sub-cluster 74. In another embodiment, the quality metric can be determined by assessing any combination of more than one quality metric.

In one embodiment, any of a plurality of feature tracks of the first sub-cluster 74a or the second sub-cluster 74b may be removed from the first or second sub-cluster 74a, 74b if the quality metric is does not exceed a threshold. For example, if a feature track triangularization quality is below a triangularization quality threshold, then a particular feature track may be discarded or otherwise not used in the bundle adjustment 92 of the sub-cluster 74. The triangularization quality threshold may be supplied by a user through any of the plurality of user devices 174 or may be calculated by the computer system 150.

In one embodiment, the one or more computer processors 154 may carry out the track filtering 88 using a spatial filter to determine whether sufficient observations are provided in a particular one of the clusters 70 or the sub-clusters 74 (which may be used for the quality metric based on quantity of feature tracks). This can be accomplished by removing and/or not using in the bundle adjustment 92 any of a plurality of clusters 70 or of a plurality of sub-clusters 74 if a feature track quantity of a particular cluster 70 or sub-cluster 74 does not exceed a feature track quantity threshold, that is, if the number of feature tracks within a cluster 70 or sub-cluster 74 is below the feature track quantity threshold. The feature track quantity threshold may be supplied by a user through any of the plurality of user devices 174 or may be calculated by the computer system 150.

In one embodiment, the one or more computer processors 154 may calculate a mean reprojection error for a feature track by determining a mean of the Euclidian distance between a reprojection point and a feature point of each feature point in the feature track. The reprojection point may be determined by the one or more computer processors 154 using the metadata of each image 18 to project the feature track geographic coordinate onto an image 18. The Euclidian distance in each image 18 is the distance between the location of the reprojection point on the image 18 and the location of the feature point in the image 18. Areas with a plurality of feature tracks near other identical or similar feature tracks, such as the region of vegetation, increase the likelihood of bad matches, which results in a lower than average mean reprojection error. A low mean reprojection error results in a low-quality bundle adjustment solution.

In one embodiment, each of the plurality of feature tracks of a particular one of the sub-clusters 74 is assigned a reprojection quality. The reprojection quality may be determined by the formula: $Quality_{reproj.} = N_{fpts} - E_{reproj,mean}$, where $N_{fpts}$ is the number of feature points in a particular feature track and $E_{reproj,mean}$ is the mean reprojection error. Any of the plurality of feature tracks with a reprojection quality not exceeding a threshold may be removed from the sub-cluster 74. The reprojection quality threshold may be supplied by a user through any of the plurality of user devices 174 or may be calculated by the computer system 150.

In one embodiment, the feature track quantity is calculated by calculating the number of feature tracks in a particular one of the sub-clusters 74. The feature track quantity threshold may be supplied by a user through any of a plurality of user devices 174 or may be calculated by the computer system 150. The feature track quantity threshold may include an upper feature track quantity threshold, a lower feature track quantity threshold, or both. In a first embodiment, if the feature track quantity exceeds the upper feature track quantity threshold, then the quantity of feature tracks that exceed the upper feature track quantity threshold may be removed from the particular sub-cluster 74. In a second embodiment, if the feature track quantity does not exceed the lower feature track quantity threshold, it is determined that insufficient observations exist, and all of the feature tracks in the particular sub-cluster are either not used in the bundle adjustment 92 or are assigned a low-quality indicator. The low-quality indicator may then be used when merging each of the sub-clusters 74 into the cluster 70a in order to account for a low-quality region without affecting or reducing the quality of the bundle adjustment solution of other sub-clusters 74.

In one embodiment, if a feature track quantity exceeds a feature track quantity threshold, the plurality of feature tracks in a particular sub-cluster 74 are sorted in order from highest reprojection quality to lowest reprojection quality. The feature tracks with the lowest reprojection quality are then removed from the particular sub-cluster 74 until the quantity of feature tracks in the particular sub-cluster 74 is equal to the feature track quantity threshold. This ensures that the feature tracks that are used in the bundle adjustment 92 have the highest quality.

Referring now to FIG. 11, shown therein is an exemplary track-building sub-sectioning process 110. In some implementations, optionally, before, or during, the track building 88, the one or more computer processors 154 may further segment the cluster 70 or the sub-cluster 74. For example, as shown in FIG. 11, the track-building sub-sectioning process 110 may section the second sub-cluster 74b, by bi-sectioning the second sub-cluster 74b into a first track cluster 114a and a second track cluster 114b.

As shown, the first track cluster 114a and the second track cluster 114b have common nodes including a first common node 118a, a second common node 118b, and a third common node 118c, which are the nodes identified previously as nodes 52c, 52k, and 52j, respectively. However, there are no common edges 56 between the first track cluster 114a and the second track cluster 114b. By bi-sectioning the second sub-cluster 74b into the first track cluster 114a and the second track cluster 114b, the one or more computer processors 154 may build feature tracks within each track cluster 114 in order to increase computational efficiency and decrease computational costs through the track building 84. Once the feature tracks are built for each track cluster 114, the feature tracks are merged back together to form a sub-cluster feature track set as depicted as revised second sub-cluster 74b' for further processing through the bundle adjustment process 80.

In the track-building sub-sectioning process 110, the one or more computer processor 154 may divide the second sub-cluster 74b into one or more track cluster 114 by utilizing a graph-cut algorithm. This track bi-sectioning may be used to further divide each track cluster 114 into one or more, smaller, track cluster 114 if the number of feature tracks within the track cluster 114 exceeds a predetermined track cluster threshold. The track-building sub-sectioning process 110 may continue until the track clusters are below the predetermined track cluster threshold.

Returning to FIG. 9, once the track building 88 is complete, the bundle adjustment process 80 may proceed to the bundle adjustment 92. The bundle adjustment (step 92) may comprise the one or more computer processor 154 bundle adjusting all remaining tracks to form a sub-cluster bundle adjustment solution for the sub-cluster 74b. The sub-cluster bundle adjustment may be performed with any common bundle adjustment algorithm, which are well known to persons having ordinary skill in the art.

Figure 12:
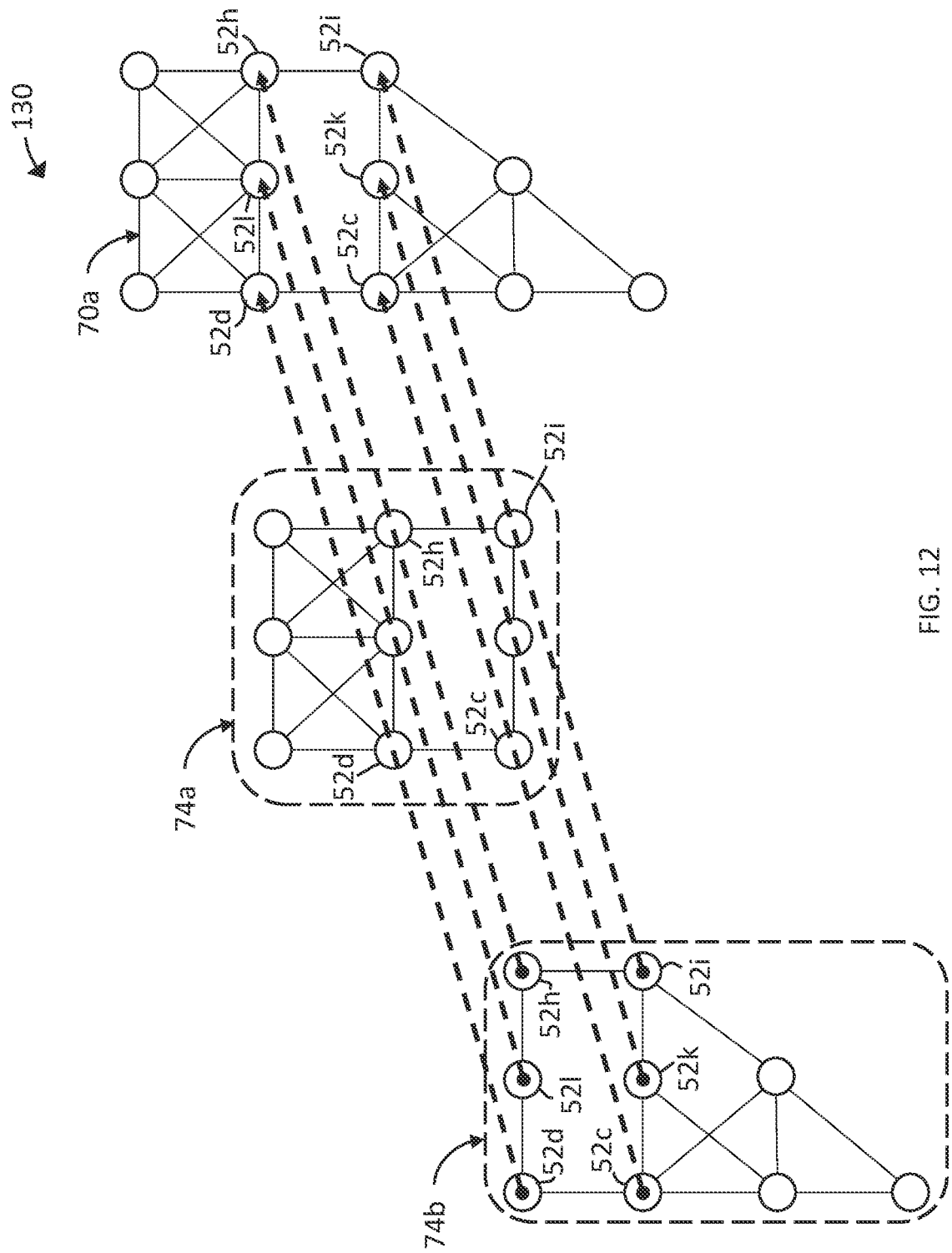
FIG. 12 is an exemplary embodiment of a reconstruction diagram depicting the reconstruction of sub-cluster bundle adjustment solutions to form a global bundle adjustment solution.

Referring now to FIG. 12, shown therein is a global bundle adjustment process 82 as depicted in a reconstruction diagram 130. The global bundle adjustment process 82 re-aligns the first sub-cluster 74a and the second sub-cluster 74b into the first cluster 70a, thereby aligning the sub-cluster bundle adjustment solution of the first sub-cluster 74a and the sub-cluster bundle adjustment solution of the second sub-cluster 74b into a global bundle adjustment. The first sub-cluster 74a and the second sub-cluster 74b are re-aligned by first setting common nodes 52 across the sub-clusters 74 as control points and then adjusting both the first sub-cluster 74a and the second sub-cluster 74b into a global alignment.

It is to be understood that the steps disclosed herein may be performed simultaneously or in any desired order. For example, one or more of the steps disclosed herein may be omitted, one or more steps may be further divided in one or more sub-steps, and two or more steps or sub-steps may be combined in a single step, for example. Further, in some exemplary embodiments, one or more steps may be repeated one or more times, whether such repetition is carried out sequentially or interspersed by other steps or sub-steps. Additionally, one or more other steps or sub-steps may be carried out before, after, or between the steps disclosed herein, for example.

From the above description and examples, it is clear that the inventive concepts disclosed and claimed herein are well adapted to attain the advantages mentioned herein. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein. For instance, although a geographic area that includes man-made objects, non-exclusive examples of which include buildings and infrastructure including roads, bridges, utility lines, pipelines, utility towers, may be used as an example, the methods and systems may be used to reduce the bundle adjustment block size of a plurality of images of any feature, including natural or non-man-made features. Also, it is to be understood that the phraseology and terminology employed herein is for purposes of description and should not be regarded as limiting.

What is claimed is:

1. A non-transitory computer readable medium storing computer executable instructions that when executed by one or more processors cause the one or more processors to:
   assign overlapping images depicting a geographic region into a cluster based on a connectivity of pairs of overlapping images, wherein connectivity is an amount of overlap between two images in the overlapping images, wherein overlap is based on one or more of: an amount of geographic area depicted in both of the two images, and, a number of shared feature points depicted in both of the two images;
   form a match graph comprising nodes indicative of the images in the cluster and edges connecting the nodes, the edges indicative of the connectivity between the images in the cluster;
   determine the cluster is above a predetermined bundle adjustment threshold;
   utilize a graph-cut algorithm on the match graph to bi-section the cluster into a first sub-cluster and a second sub-cluster, the first sub-cluster sharing at least one node with the second sub-cluster, the first sub-cluster having at least one node not in the second sub-cluster, the second sub-cluster having at least one node not in the first sub-cluster; and
   conduct a bundle adjustment process on the images within at least one of the first sub-cluster and the second sub-cluster.

2. The non-transitory computer readable medium of claim 1, wherein the bundle adjustment process comprises:
   building feature tracks of features from the images in the sub-cluster;

reducing a number of feature tracks in the sub-cluster; and
bundling the feature tracks.

3. The non-transitory computer readable medium of claim 2, wherein reducing the number of feature tracks in the sub-cluster comprises removing feature tracks having a track quality metric that is below a track quality threshold.

4. The non-transitory computer readable medium of claim 3, wherein the track quality metric is based on one or more of: a feature track triangularization quality, a feature point quantity within the feature track, a mean reprojection error for the feature track, and a quantity of feature tracks in the sub-cluster.

5. The non-transitory computer readable medium of claim 2, wherein reducing the number of feature tracks in the sub-cluster comprises removing feature tracks utilizing a spatial filter.

6. The non-transitory computer readable medium of claim 2, wherein reducing the number of feature tracks in the sub-cluster comprises bi-sectioning the sub-cluster into smaller sub-clusters having no connectivity between the smaller sub-clusters.

7. The non-transitory computer readable medium of claim 1, wherein the overlapping images are associated with camera pose data of one or more cameras that captured the overlapping images, and wherein conducting the bundle adjustment process on the images within the sub-cluster produces adjusted camera pose data, the non-transitory computer readable medium storing computer executable instructions that when executed by one or more processors cause the one or more processors to:
triangulate one or more of the images utilizing the adjusted camera pose data.

8. The non-transitory computer readable medium of claim 1, wherein the sub-clusters include a first sub-cluster and a second sub-cluster sharing at least one image, the non-transitory computer readable medium storing computer executable instructions that when executed by one or more processors cause the one or more processors to:
align the first sub-cluster with the second sub-cluster into the cluster, based on the at least one shared image, after conducting the bundle adjustment process.

9. The non-transitory computer readable medium of claim 6, wherein bi-sectioning the sub-cluster into smaller sub-clusters includes utilizing the match graph.

10. The non-transitory computer readable medium of claim 1, wherein the predetermined bundle adjustment threshold is based on one or more of: a quantity of the images in the cluster, a quantity of feature points in the cluster, the connectivity between the pairs of overlapping images, feature point quality, and feature match quality.

11. A method, comprising:
assigning, by one or more computer processors, overlapping images depicting a geographic region into a cluster based on a connectivity of pairs of overlapping images, wherein connectivity is an amount of overlap between two images in the overlapping images, wherein overlap is based on one or more of: an amount of geographic area depicted in both of the two images, and, a number of shared feature points depicted in both of the two images;
forming, by the one or more computer processors, a match graph comprising nodes indicative of the images in the cluster and edges connecting the nodes, the edges indicative of the connectivity between the images in the cluster;
determining, by the one or more computer processors, the cluster is above a predetermined bundle adjustment threshold;
utilizing, by the one or more computer processors, a graph-cut algorithm on the match graph to bi-section the cluster into a first sub-cluster and a second sub-cluster, the first sub-cluster sharing at least one node with the second sub-cluster, the first sub-cluster having at least one node not in the second sub-cluster, the second sub-cluster having at least one node not in the first sub-cluster; and
conducting, by the one or more computer processors, a bundle adjustment process on the images within at least one of the first sub-cluster and the second sub-cluster.

12. The method of claim 11, wherein the bundle adjustment process comprises:
building feature tracks of features from the images in the sub-cluster;
reducing a number of feature tracks in the sub-cluster; and
bundling the feature tracks.

13. The method of claim 12, wherein reducing the number of feature tracks in the sub-cluster comprises removing feature tracks having a track quality metric that is below a track quality threshold.

14. The method of claim 13, wherein the track quality metric is based on one or more of: a feature track triangularization quality, a feature point quantity within the feature track, a mean reprojection error for the feature track, and a quantity of feature tracks in the sub-cluster.

15. The method of claim 12, wherein reducing the number of feature tracks in the sub-cluster comprises removing feature tracks utilizing a spatial filter.

16. The method of claim 12, wherein reducing the number of feature tracks in the sub-cluster comprises bi-sectioning the sub-cluster into smaller sub-clusters having no connectivity between the smaller sub-clusters.

17. The method of claim 11, wherein the overlapping images are associated with camera pose data of one or more cameras that captured the overlapping images, and wherein conducting the bundle adjustment process on the images within the sub-cluster produces adjusted camera pose data, the method further comprising:
triangulating, by the one or more computer processors, one or more of the images utilizing the adjusted camera pose data.

18. The method of claim 11, wherein the sub-clusters include a first sub-cluster and a second sub-cluster sharing at least one image, the method further comprising:
aligning the first sub-cluster with the second sub-cluster into the cluster, based on the at least one shared image, after conducting the bundle adjustment process.

19. The method of claim 16, wherein bi-sectioning the sub-cluster into smaller sub-clusters includes utilizing the match graph.

20. The method of claim 11, wherein the predetermined bundle adjustment threshold is based on one or more of: a quantity of the images in the cluster, a quantity of feature points in the cluster, the connectivity between the pairs of overlapping images, feature point quality, and feature match quality.

* * * * *

UNITED STATES PATENT AND TRADEMARK OFFICE
CERTIFICATE OF CORRECTION

PATENT NO. : 11,948,329 B2
APPLICATION NO. : 18/057061
DATED : April 2, 2024
INVENTOR(S) : David Nilosek It is certified that error appears in the above-identified patent and that said Letters Patent is hereby corrected as shown below:

In the Specification
Column 14, Line 9: After "52$c$, 52$d$," delete "52l" and replace with -- 52$l$ --

Signed and Sealed this
Thirtieth Day of April, 2024

Katherine Kelly Vidal
*Director of the United States Patent and Trademark Office*